United States Patent Office 2,762,836
Patented Sept. 11, 1956

2,762,836
SYNTHESIS OF THIODINITRILES

William H. Selcer, Texas City, Tex., assignor to Monsanto Chemical Company, St. Louis, Mo., a corporation of Delaware No Drawing. Application December 8, 1952,
Serial No. 324,820

9 Claims. (Cl. 260—465.8)

This invention relates to the synthesis of sulfur-containing organic compounds and more particularly to the synthesis of thiodinitriles from the corresponding halonitriles.

The thiodinitriles find potential application in the fields of petroleum, plastics, synthetic rubber, fats and edible oils, etc., being useful themselves or as intermediates in the production of selective solvents, plasticizing, wetting and antifreeze agents, insecticides, and the like.

It is primarily an object of the invention to provide a process for the preparation of thiodinitriles which is simple, efficient, and readily adaptable to practice on a commercial scale.

It is a further object of the invention to provide a process for the preparation of thiodinitriles from the corresponding halonitriles. Other objects of the invention will appear hereinafter.

In accordance with this invention, a thiodinitrile of the formula

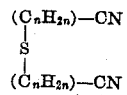

where $n$ is an integer from 1 to 7 is produced by reacting an aliphatic monohalonitrile containing from 1 to 8 carbon atoms with an alkali metal hydrosulfide. In its broadest aspect, the process of the invention comprises refluxing the halonitrile and the hydrosulfide in the presence of a non-aqueous solvent, filtering off the by-product, an alkali metal halide, distilling off the solvent or reaction medium, and obtaining the desired thiodinitrile product by crystallization.

The following examples are given to illustrate a preferred method for producing the thiodinitriles of the invention. The details set forth in the examples, however, are not to be considered as limitative of the invention.

Example I

A solution of β-chloropropionitrile was made by dissolving 25 g. of this compound in 158 ml. of absolute ethanol. Approximately 23.5 g. of pure sodium hydrosulfide was dissolved in 150 ml. ethanol. These two solutions were mixed in a reaction vessel fitted with a reflux condenser and refluxed (i. e., boiled under reflux conditions) on a steam bath for two hours. The reaction mixture was then cooled and filtered to remove the sodium chloride which was formed. The filtrate was acidified with dilute $H_2SO_4$ whereupon a slight additional amount of precipitate was formed. This mixture was filtered and the filtrate was distilled under vacuum to remove ethanol. The pot residue, a dark red oil, was dissolved in a minimum amount of boiling water. Charcoal was added, the mixture was boiled for five minutes, and the aqueous solution was filtered. Upon cooling, 17 g. of a light orange colored oil was formed. This oil was crystallized in Dry Ice and tentatively identified as β,β′-thiodipropionitrile by a melting point determination.

The observed melting point was 14–18° C., as compared to the reported literature value of 22–28° C.

For more positive identification, a small quantity of the oil was refluxed for two hours in 75 ml. of concentrated hydrochloric acid. The precipitate formed as the solution was cooled was filtered, recrystallized twice from water, and dried. The observed melting point of this derivative, β,β′-thiodipropionic acid, resulting from hydrolysis of β,β′-thiodipropionitrile, was 126–9° as compared to the reported melting point of 129–131° C. for the compound. An infrared analysis also confirmed that the compound was β,β′-thiodipropionitrile.

Example II

Using the same procedure as described in Example I and equivalent molecular quantities of bromoacetonitrile and sodium hydrosulfide, a good yield of thiodiacetonitrile is obtained.

Example III

A solution of one mol of α-chloroisobutyronitrile in absolute ethanol and a solution of 1.5 moles of potassium hydrosulfide in absolute ethanol are mixed in a reaction vessel fitted with a reflux condenser and refluxed on a steam bath for several hours. The reaction mixture is filtered to remove the sodium chloride present and the ethanol is removed from the filtrate by distillation under vacuum. α,α′-Thiodiisobutyronitrile in good yield is obtained by crystallization from the distilland.

The aliphatic mononitriles used as raw materials in the process of the invention may be readily prepared by any of a number of known methods. Acceptable methods are described, for example, in U. S. Patents 2,283,237, 2,331,681, 2,426,901, 2,524,011, and 2,524,020.

Any of the alkali metal hydrosulfides, sodium hydrosulfide, potassium hydrosulfide, or lithium hydrosulfide may be used.

Equimolecular proportions of reactants may be employed but a slight excess of the hydrosulfide is preferable (approx. 1.5:1).

Any non-aqueous solvent which will dissolve, either partially or completely, both the halonitrile and the hydrosulfide and which is substantially chemically inert to these reactants may be used as the liquid medium for the reaction. Suitable solvents or media are the lower aliphatic alcohols such as methanol and ethanol and ether alcohols such as the monomethyl ether of ethylene glycol, ethylene glycol ethyl ether, or tetrahydrofurfuryl alcohol. The use of ethanol for this purpose is preferred in view of the high yields obtainable thereby.

The temperature at which the reaction is carried out may vary in accordance with the boiling point of the solvent used. It is preferred to operate at a temperature approximating the boiling point of the solvent reaction medium with means provided for reflux of the reaction mixture. However, the reaction may be carried out below the boiling point of the reaction mixture if enough time is allowed for the reaction to occur.

Since it is obvious that many changes and modifications can be made in the above-described details without departing from the nature and spirit of the invention, it is understood that the invention is not to be limited to said details except as set forth in the following claims.

What is claimed is:

1. A process for the production of thiodinitriles of the formula

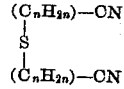

where $n$ is an integer from 1 to 7 which comprises reacting, in a non-aqueous solvent reaction medium, a mixture consisting of an aliphatic monohalonitrile containing from 1 to 8 carbon atoms and an alkali metal hydrosulfide.

2. A process for the production of thiodinitriles of the formula

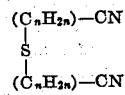

where *n* is an integer from 1 to 7 which comprises reacting in a non-aqueous solvent reaction medium and under reflux conditions a mixture consisting of an aliphatic monohalonitrile containing from 1 to 8 carbon atoms and an alkali metal hydrosulfide.

3. A process for the production of thiodinitriles of the formula

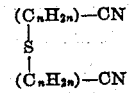

where *n* is an integer from 1 to 7 which comprises reacting in ethanol and under reflux conditions a mixture consisting of an aliphatic monohalonitrile containing from 1 to 8 carbon atoms and an alkali metal hydrosulfide.

4. A process for the production of β,β'-thiodipropionitrile which comprises reacting a mixture consisting of a β-halopropionitrile and an alkali metal hydrosulfide in a non-aqueous solvent reaction medium.

5. A process for the production of β,β'-thiodipropionitrile which comprises reacting under reflux conditions a mixture consisting of β-chloropropionitrile and sodium hydrosulfide in ethanol.

6. A process for the production of thiodiacetonitrile which comprises reacting a mixture consisting of a haloacetonitrile and an alkali metal hydrosulfide in a non-aqueous solvent reaction medium.

7. A process for the production of thiodiacetonitrile which comprises reacting under reflux conditions, a mixture consisting of bromoacetonitrile and sodium hydrosulfide in ethanol.

8. A process for the production of α,α'-thiodiisobutyronitrile which comprises reacting a mixture consisting of an α-haloisobutyronitrile and an alkali metal hydrosulfide in a non-aqueous solvent reaction medium.

9. A process for the production of α,α'-thiodiisobutyronitrile which comprises reacting, under reflux conditions, a mixture consisting of α-chloroisobutyronitrile and potassium hydrosulfide in ethanol.

References Cited in the file of this patent

UNITED STATES PATENTS

| | | |
|---|---|---|
| 2,527,509 | Allen et al. | Oct. 31, 1950 |
| 2,571,251 | Jones | Oct. 16, 1951 |
| 2,654,726 | Fisher et al. | Oct. 6, 1953 |

OTHER REFERENCES

Gabriel: Ber. Deut. Chem., vol. 23, page 2493 (1890).

Zweigbergk: Ber. Deut. Chem., vol. 45, page 3337 (1912).

Loven et al.: Ber. Deut. Chem., vol. 48, page 1260 (1915).

Nekrassow: J. prakt. Chem. (2), vol. 117, page 212 (1927).

Vorozhtzov: 28, C. A., Column 2341 (1934).